US007896936B2

(12) United States Patent
Adelman et al.

(10) Patent No.: US 7,896,936 B2
(45) Date of Patent: Mar. 1, 2011

(54) FILTER CLEANING APPARATUS

(75) Inventors: Kurt Clarence Adelman, Sauk Rapids, MN (US); Richard William Wellens, Minneapolis, MN (US); Michael Thomas Basham, Osseo, MN (US)

(73) Assignee: Tennant Company, Minneapolis, MN (US)

( * ) Notice: Subject to any disclaimer, the term of this patent is extended or adjusted under 35 U.S.C. 154(b) by 343 days.

(21) Appl. No.: 12/043,932

(22) Filed: Mar. 6, 2008

(65) Prior Publication Data

US 2008/0271419 A1 Nov. 6, 2008

Related U.S. Application Data

(60) Provisional application No. 60/893,356, filed on Mar. 6, 2007.

(51) Int. Cl.
*B01D 46/04* (2006.01)

(52) U.S. Cl. .............................. 55/300; 55/304; 55/356; 55/430; 55/432; 55/467

(58) Field of Classification Search .................... 55/304, 55/283, 300, 356, 430, 432, 467
See application file for complete search history.

(56) References Cited

U.S. PATENT DOCUMENTS 5,013,333 A * 5/1991 Beaufoy et al. ................. 95/20

* cited by examiner

*Primary Examiner*—Duane Smith
*Assistant Examiner*—Tiffany N Palmer
(74) *Attorney, Agent, or Firm*—Briggs and Morgan, P.A.

(57) ABSTRACT

A filter cleaning mechanism for a cylindrical filter within a filter box of a surface maintenance machine having a shaker plate engaging a top end of the filter and having vibrations induced via a motor and eccentric mass combination. In one example, the motor and eccentric mass are mounted to a hinged cover plate via a vibration isolating connection. A pair of slot structures may limit movement of the filter to a generally vertical direction relative to ground.

20 Claims, 12 Drawing Sheets

FILTER CLEANING APPARATUS

RELATED APPLICATIONS

This application claims priority under 35 U.S.C. 119(e) from provisional U.S. Patent Application No. 60/893,356 filed Mar. 6, 2007 the contents of which are incorporated herein by reference.

TECHNICAL FIELD

The present disclosure is directed to air filtration systems. More specifically, the present disclosure is directed to a filter shaking mechanism and method of use for extending the useful life of air filters on surface maintenance machines and the like.

BACKGROUND OF THE INVENTION

Over the years various kinds of machines have been developed for cleaning and maintaining floors inside buildings, and paved outdoor areas such as streets, sidewalks and parking lots. They include such machines as rotary broom sweepers, vacuum sweepers, scarifiers, burnishers, polishers and scrubbers. For our purposes here they can be divided into machines which apply water to the surface being maintained and machines which operate dry. We are concerned with the latter, which would include many vacuum sweepers, scarifiers, and rotary broom sweepers. They all share one problem which is addressed by this invention. In their normal operation they tend to stir up dust from the surface being maintained. If it is not controlled, this dust is highly objectionable.

On many of these machines the problem has received one general solution. The functional tool which generates the dust, such as a rotary broom, a scarifier head, or a vacuum pickup, is provided with a cover and surrounded by walls which have rubber skirts that hang down almost to the surface being maintained. An on board exhaust blower continuously pulls air from the tool chamber thus created so there is a sub-atmospheric air pressure within it which eliminates outflow of dusty air from under the skirts. The blower exhausts this air to atmosphere. One or more air filters are placed in this air path, either upstream or downstream from the blower, to remove dust from the air before it is released so the discharge to atmosphere will be dust free.

The dust thus removed from the air stream builds up on the filters and in time will block off the airflow through them unless they are periodically cleaned, so a cleaning means is commonly provided which the machine operator must use when needed. Generally the operator must be watchful for dust coming out from under the skirts, which indicates that airflow has been reduced by dust plugging the filters. He or she then must stop the machine, shut off the air flow, and activate the cleaning means. This is most commonly a mechanism that shakes or jolts the filters for a predetermined time to shake off the dust, which falls to a collection tray for later removal. Then the air flow is re-started and the machine operation is resumed. This method is effective when properly carried out, but it takes time away from productive operation. Some operators carelessly neglect doing it when needed, so that dust escapes from the machine while it is operating and settles on objects in the area. Also, filters that are allowed to get too dirty cannot be as effectively cleaned and must be replaced more often than properly serviced filters.

To eliminate these shortcomings it has been desirable to provide an automatic filter cleaning system that requires no attention from the operator. There have been efforts in that direction. U.S. Pat. Nos. 4,637,825 and 4,756,727 each show a sweeper filter that is automatically cleaned while the sweeper is operating by directing pulses of compressed air sequentially against segments of the filter from its clean side to blow off dust. U.S. Pat. No. 5,013,333, incorporated by reference herein, shows a sweeper filter that is automatically cleaned while the sweeper is operating by application of periodic activation of a mechanical shaker mechanism.

BRIEF SUMMARY OF THE INVENTION

The present invention is directed to a filter cleaning system for a mobile surface maintenance machine and the like. One or more filters are provided within a filtration system. The filter(s) can be cylindrical filters. The filtration system can be vacuum-based. As dust accumulates on the filter surfaces it offers increasing resistance to the air flow, which results in increasing differential air pressure across the filter. This may be sensed by a differential pressure switch which initiates a cleaning cycle when a predetermined differential pressure level is reached. This level may be set low enough to assure adequate dust control for the machine and long life for the filters. At the same time it does not subject the cleaning apparatus or the filters to the wear and tear of continuous cleaning cycles. It is responsive to the work environment, cleaning more often in very dirty conditions and less often in cleaner places.

In one embodiment, a cylindrical filter shaking mechanism includes an eccentric mass mounted on an electric motor which is in contact with the filter box. The cleaning cycle includes a mechanical shaker device which repeatedly shakes the filter, knocking off the dust on it, which falls into a collection tray or platform. The entire cleaning cycle operates manually or automatically with no attention from the operator.

A preferred example of the invention utilizes a cylindrical pleated media filter. However, the invention will accommodate air filters of other types. An alternative design includes two or more flat panel pleated media filters, and other known types of air filters may also be successfully employed. These might include, for example, cloth filters formed into bags, envelopes or socks, which are well known types of filters in the field of air filtration.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

A conventional forward throw rotary broom sweeper will be used by way of example in the following description of the invention. However, it should be understood that, as already stated, the invention could as well be applied to other types of mobile surface maintenance machines, such as, for example, other types of rotary broom sweepers, scarifiers, and various types of vacuum sweepers.

Figure 1:
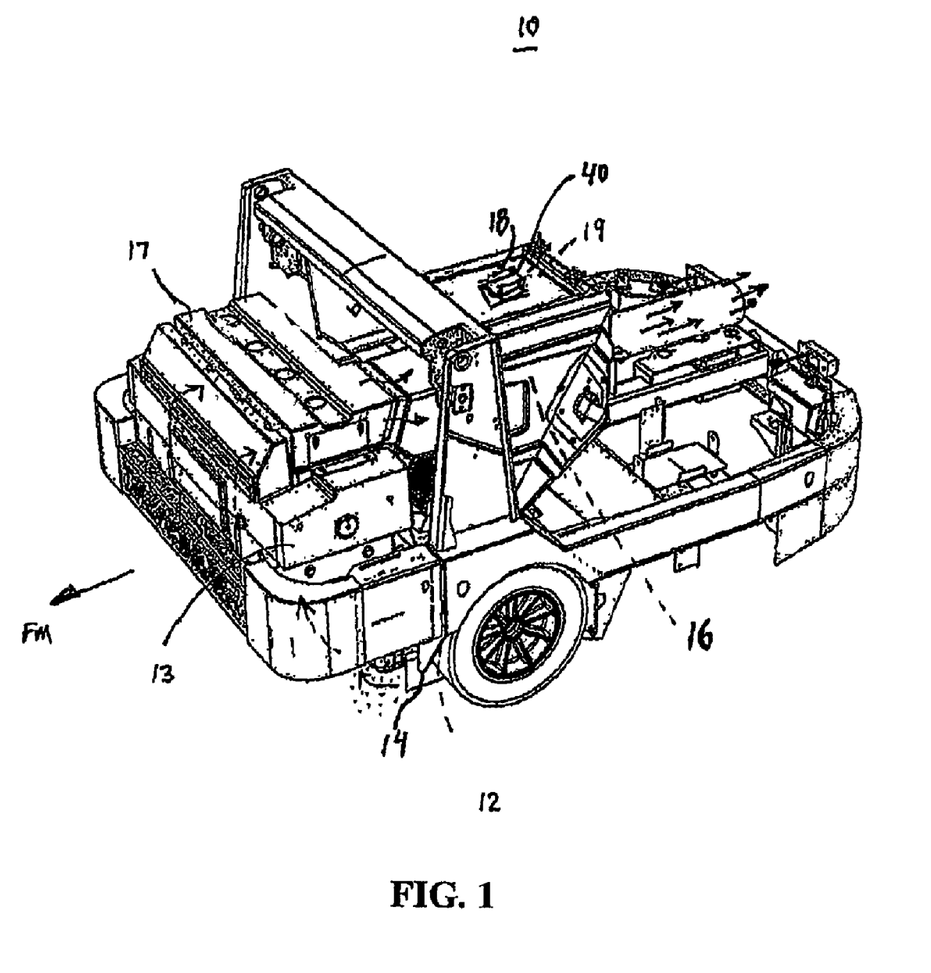
FIG. 1 is a perspective illustration of one embodiment of a cleaning machine utilizing a filter cleaning system in accordance with the present invention.

With reference to FIG. 1, there is shown an industrial sweeping machine 10. As illustrate, machine 10 is a forward throw sweeper with an intended direction of motion indicated by arrow marked FM. Machine 10 could as well be an over-the-top, rear hopper sweeper, a type which is also well known in the art. Machine 10 has a rotating cylindrical brush 12 for sweeping debris from a floor or other surface into a debris hopper 13. Hopper arms (not shown) allow hopper 13 to be lifted during a dumping procedure. The brush chamber generally encloses brush 12 under skirts 14 to control air flow around brush 12. The skirts 14 largely contain within the brush chamber any dust stirred up by the brush 12. To complete the dust control there is a suction blower or vacuum fan 16 which exhausts air from the brush chamber to atmosphere in an airflow path shown by the arrows in FIG. 1. Vacuum fan 16 is housed within filter box 18 and includes an impeller which is driven by the machine's hydraulic system. Vacuum fan 16 maintains a sub-atmospheric pressure within the brush chamber so that air is drawn in under the skirts rather than flowing out. Thus relatively little dust escapes from around skirts 14. During machine 10 operation, vacuum fan 16 draws debris and dust-entrained air through prefilter 17 and filter 19 contained within filter box 18 prior to exhaust. Shaker mechanism 40 is provided on filter box 18. Periodic activation of shaker mechanism shakes filter 19 to dislodge dust and debris. Various components of machine 10 have been left out of FIG. 1, e.g., the drive engine, housings and operator station have been omitted to improve understanding of the aspects of the present invention. Additional examples of surface maintenance machine suitable for adaptation in accordance with the present invention are found in U.S. Pat. Nos. 5,254,146 and 5,303,448, each patent being incorporated by reference herein for all purposes.

Figure 2:
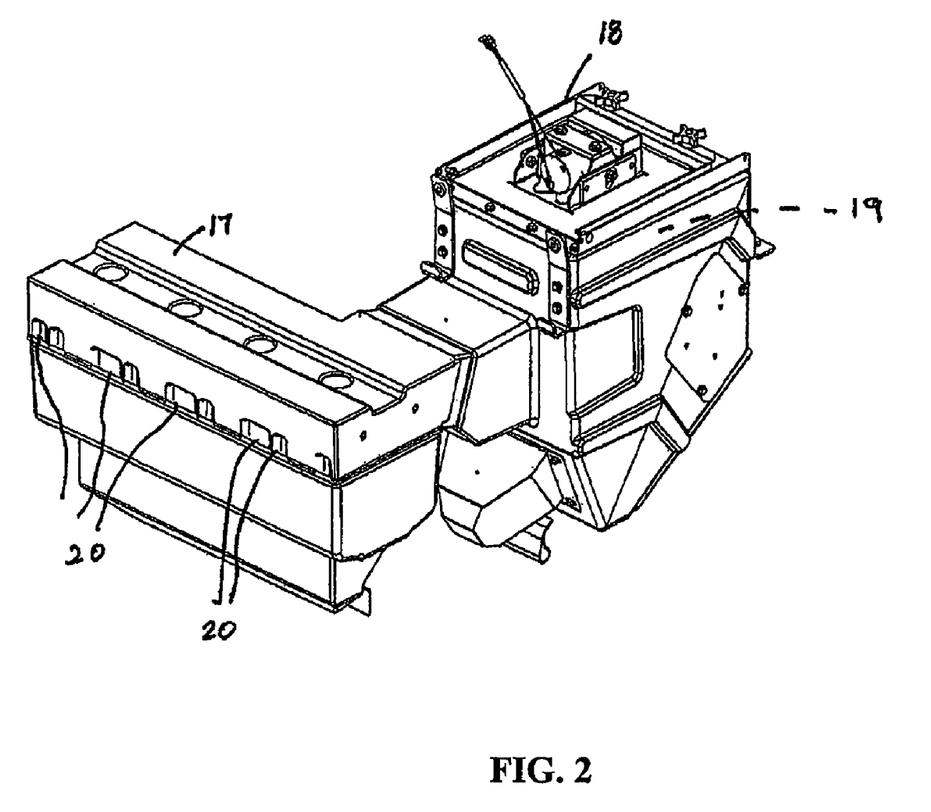
FIGS. 2 and 3 are perspective illustrations of the prefilter chamber and filter box of the cleaning machine of FIG. 1.

FIG. 2 is a perspective view of prefilter 17 and filter box 18. Filter box 18 houses cylindrical filter 19 as described in more detail hereinafter. Dust and debris-laden air is drawn by vacuum action into prefilter openings 20. Together the prefilter 17 and filter box 18 remove dust and/or debris from the air stream so the vacuum fan 16 will exhaust relatively clean air to atmosphere during machine 10 operation. Prefilter 17 may comprise a bank of cyclonic filters through which dusty air passes causing separation and retention of at least some of the larger dust particles and debris. Additional features of the prefilter 17 assembly can be found by reference to U.S. Ser. No. 60/893,560, entitled "Counter Rotating Cyclonic Filter", and incorporated by reference herein.

In a preferred embodiment, filter box 18 includes a cylindrical pleated media filter 19, such as are manufactured, for example, by Donaldson Company, Inc. of Minneapolis, Minn. Filter 19 has a pleated media, with the pleats running parallel to the centerline of the cylinder, which makes them vertical when installed as shown. The pleated media is surrounded with a perforated metal sleeve for structural integrity. Outside the metal sleeve may be provided a fine mesh sleeve (not shown) woven from a slippery synthetic filament which stops the coarser dust and sheds it easily during a filter cleaning cycle. The ends of the cylindrical filter are open. Other filter technologies could be utilized in alternative embodiments of filter box 18.

Figure 3:
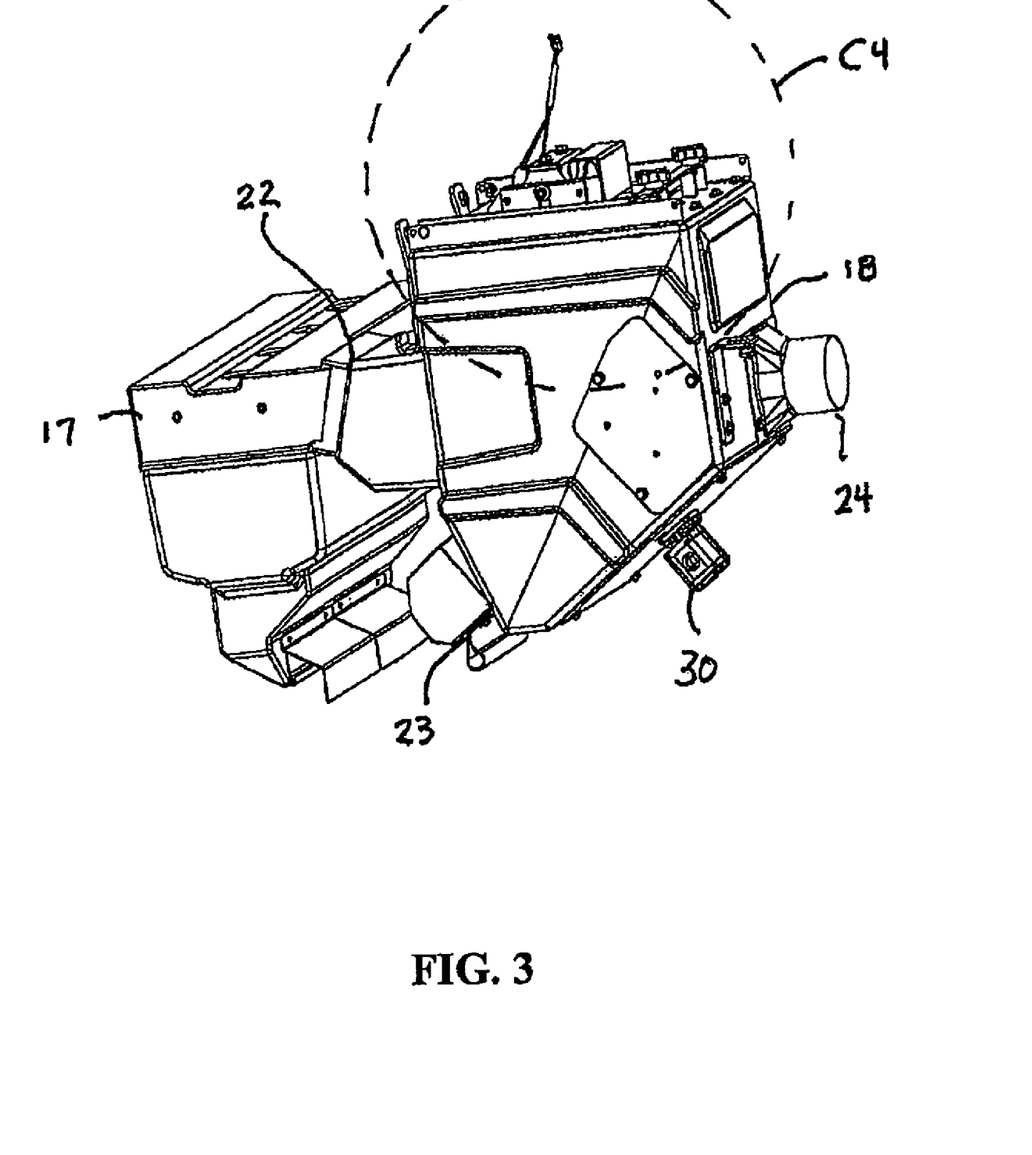

As shown in FIG. 3, filter box 18 has an intake opening 22 at the front of the machine 10 to admit air from the prefilter assembly 17. Dust and debris captured by filter box 18 is removable via a lower debris outlet port 23. Filter air is directed out of filter box 18 at air outlet 24. Upon deactivation of the vacuum system, an accumulation of dust and debris passes through a seal at debris outlet port 23 and into the machine hopper 13 (not shown). During machine 10 operation, this the debris outlet port seal is kept closed by vacuum action. Filter box 18 includes vacuum fan motor 30 which is coupled to the vacuum impeller (not shown). Additional details of filter box 18 may be found in Applicants' application Ser. No. 12/043,945, for "External Filter Chamber" filed on equal date herewith and incorporated by reference herein.

Figure 4:
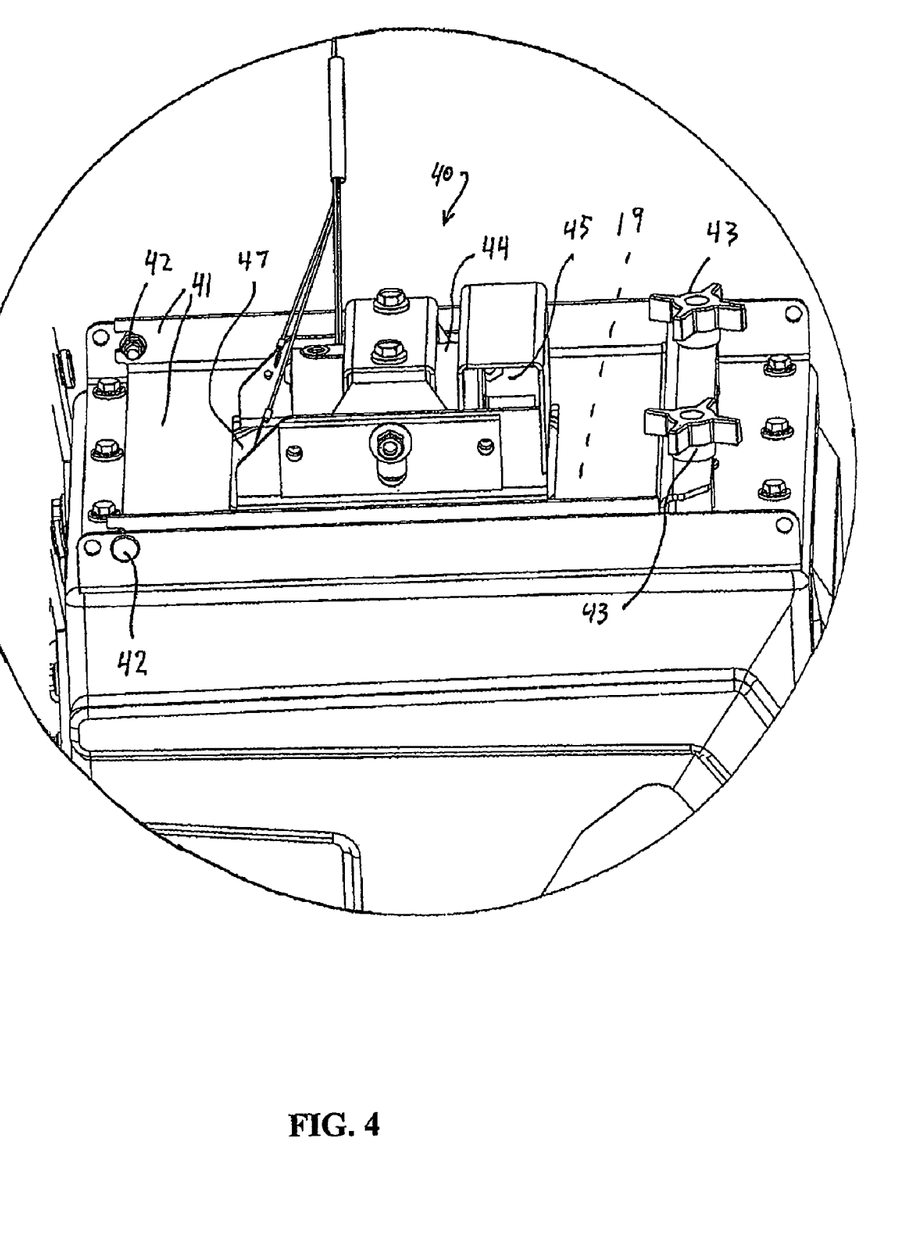
FIG. 4 is an enlarged portion of FIG. 3 contained within circle C4.

FIG. 4 is an enlarged portion of the filter box 18 showing details of shaker mechanism 40 as indicated by circle, C4, in FIG. 3. A hinged cover plate 41 is secured on top of filter box 18 by two hinge assemblies 42 and two clamp assemblies 43. When clamp assemblies 43 are released, cover plate 41 and connected components rotate about the hinges 42 to allow access into filter box 18. Cover plate 41 has a large generally rectangular opening in it corresponding to the general location of the cylindrical filter 19.

Shaker mechanism 40 includes an electric motor 44 coupled to an eccentric mass 45. Electric motor 44 is coupled to a shaker plate 47 which engages the top of filter 19. Shaker mechanism 40 also includes a vibration-isolating motor mount assembly which permits shaker plate 47 to vibrate generally independently relative to cover plate 41 during a filter shaking procedure.

Figure 5:
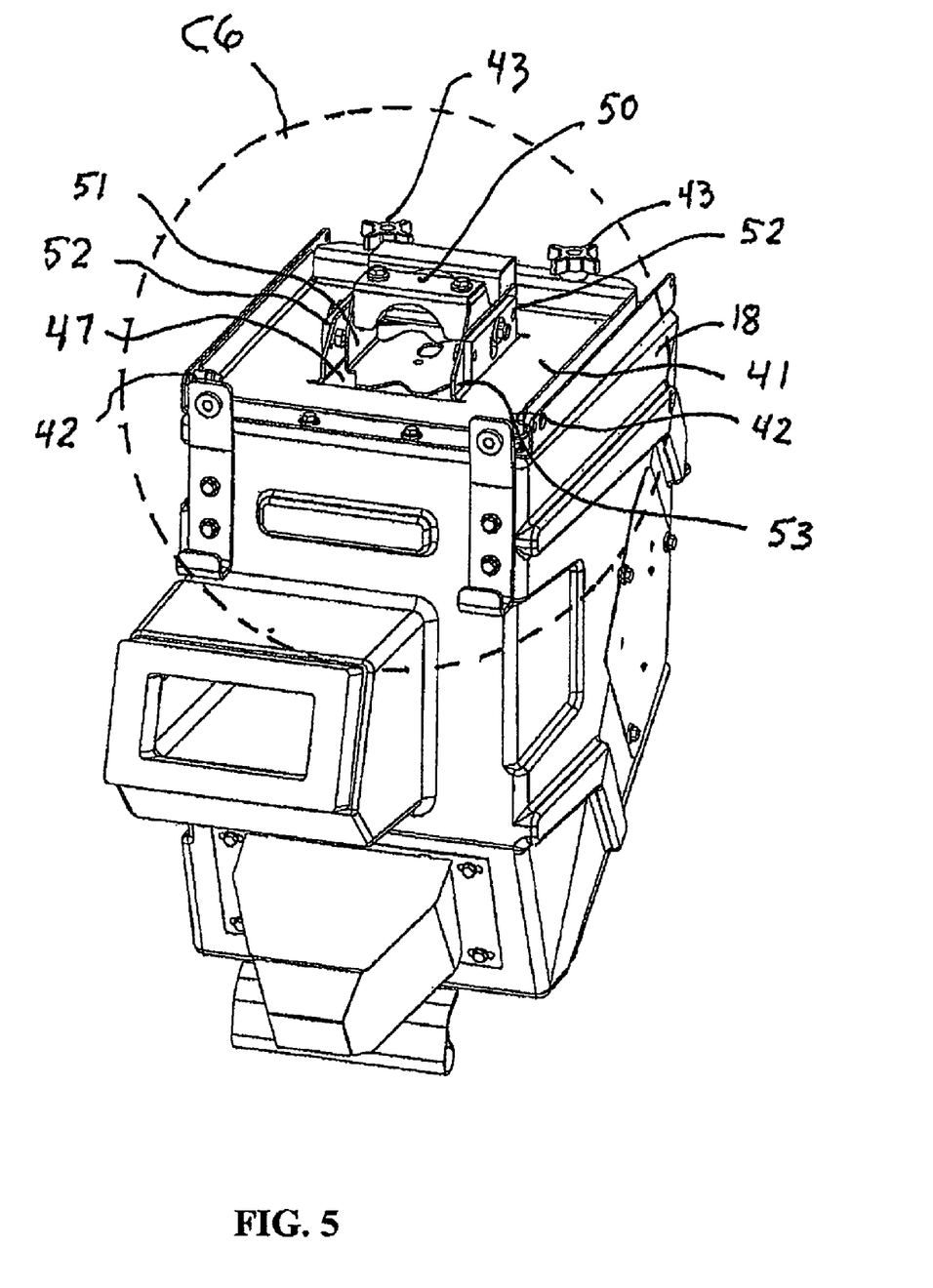
FIG. 5 is a perspective illustration of the prefilter chamber and filter box of FIG. 1.
Figure 6:
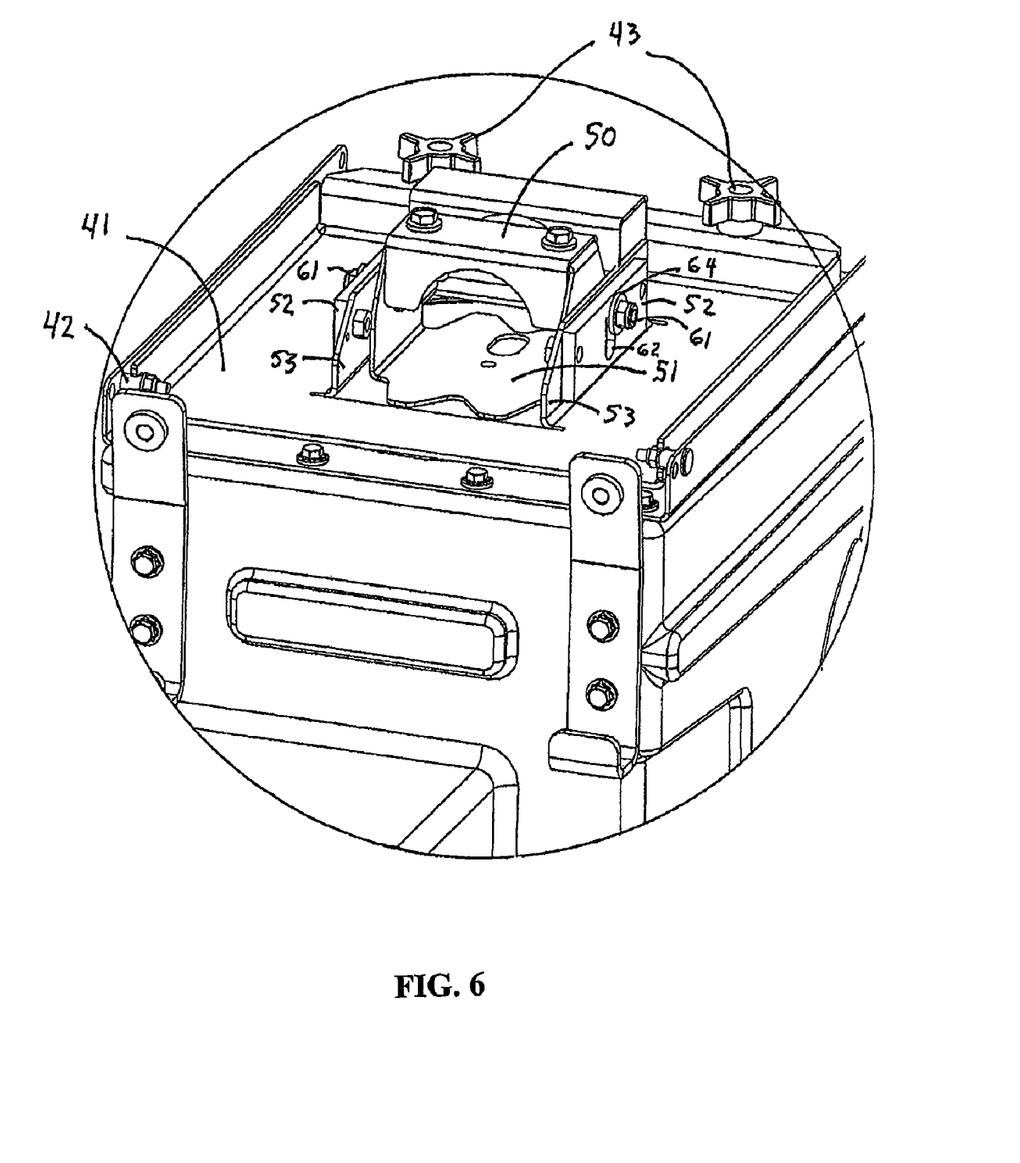
FIG. 6 is an enlarged portion of FIG. 5 contained within circle C6.

Referring to FIG. 5, the motor mount assembly includes a motor clamp 50, motor saddle 51, and a pair of slide plates 52 secured to upwardly directed flanges 53 of hinged cover plate 41. Electric motor 44 and eccentric mass 45 have been removed in this illustration. FIG. 6 is an enlarged portion of the filter box 18 assembly showing details of shaker mechanism 40 as indicated by circle, C6, in FIG. 5.

Motor 44 is secured between motor clamp 50 and saddle 51. Saddle 51 is rigidly coupled to shaker plate 47. Saddle 51 is movably coupled to slide plates 52 via a pair of fasteners 61. In this example, fasteners 61 are free to move within slots 62 to permit a generally vertical displacement of the saddle 51, clamp 50, motor 44 and eccentric mass 45 during a filter shaking procedure. Washers 64 slide against slide plates 52 as limited by slots 62.

Figure 7:
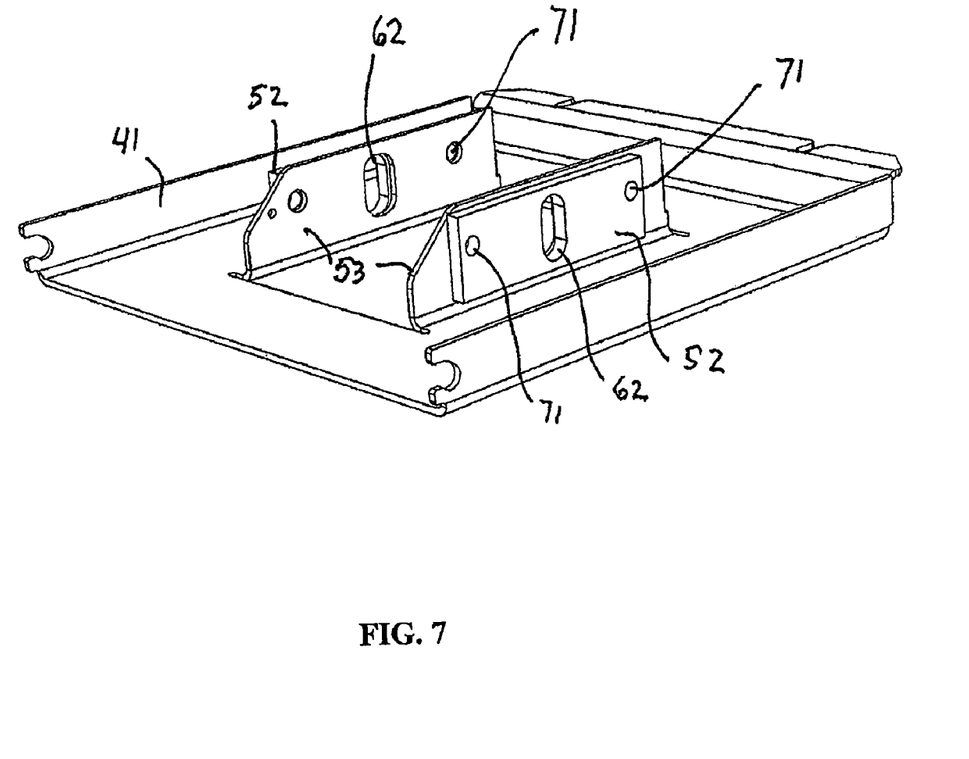
FIG. 7 is a perspective view of a cover component of the embodiment of FIG. 1.

FIG. 7 illustrates hinged filter cover plate 41 and slide plates 52. Fasteners (not shown) pass through openings 71 and secured slide plates 52 to flanges 53 of cover plate 41. Slots 62 extend through generally equally sized openings in slide plates 52 and flanges 53. In one example, slide plates 52 are of a durable material with substantially improved wear resistance relative to cover plate 41.

Figure 8:
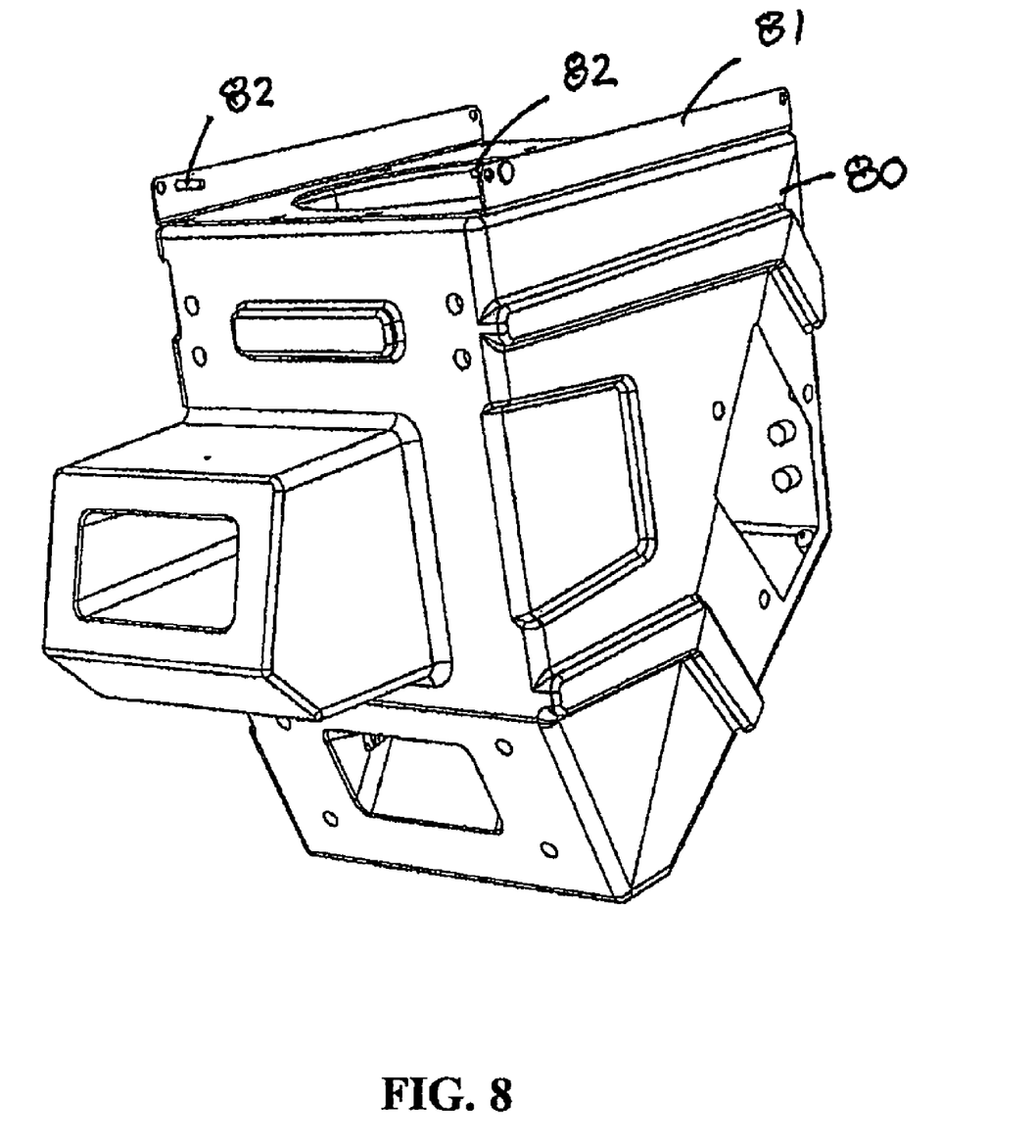
FIG. 8 is a perspective view of a housing of the embodiment of FIG. 1.

FIG. 8 illustrates housing 80 of filter box 18 and filter box cover 81. Cover 81 is secured to housing 80 in this example via threaded fasteners. Pin-shaped components 82 are included within hinge assemblies 42 and support cover plate 41 and connected components when cover plate 41 is opened, such as during a filter exchange.

Figure 9:
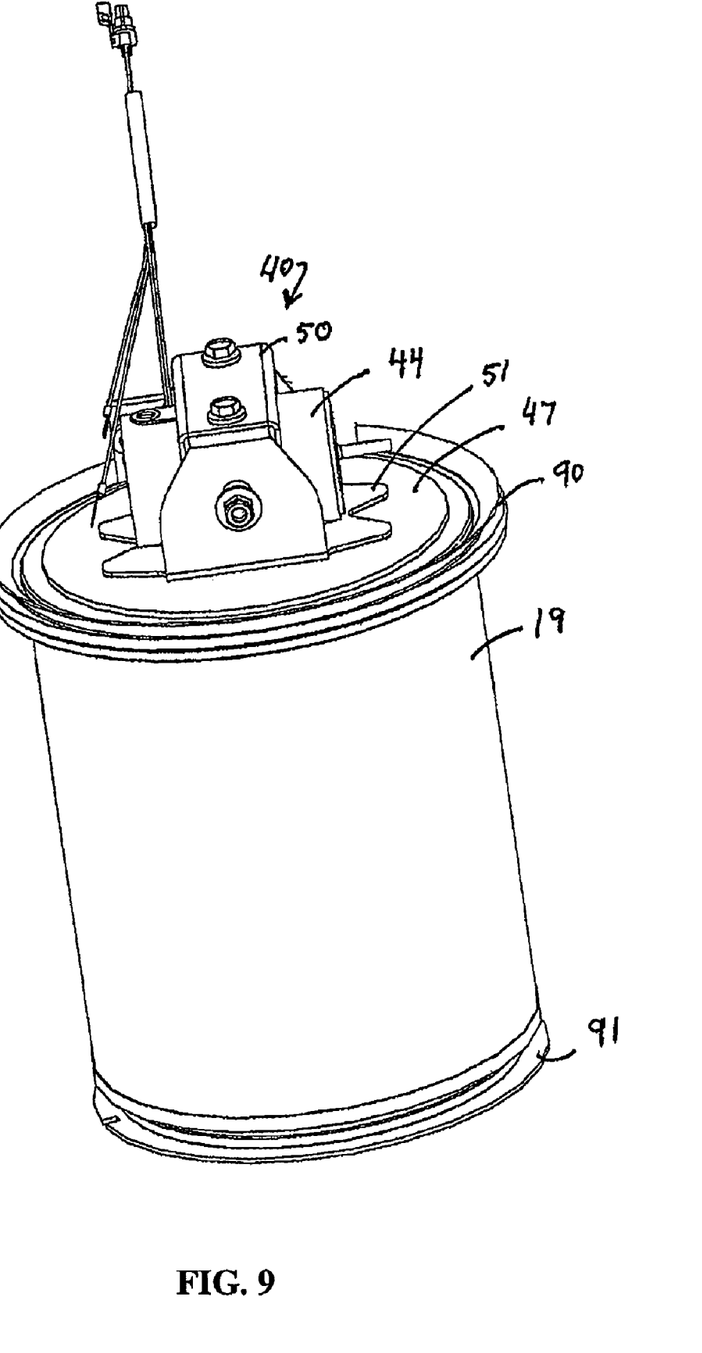
FIG. 9 is a perspective view of a filter and filter shaker mechanism of FIG. 1.

FIG. 9 illustrates components of shaker mechanism 40 and filter 19. In this example, shaker plate 47 is in generally direct contact with one end of filter 19. The opposite end of filter 19 is supported by a base within housing 80 (not shown). Upper annular seal 90 and lower annular seal 91 control air flow through top openings of filter 19.

Figure 10:
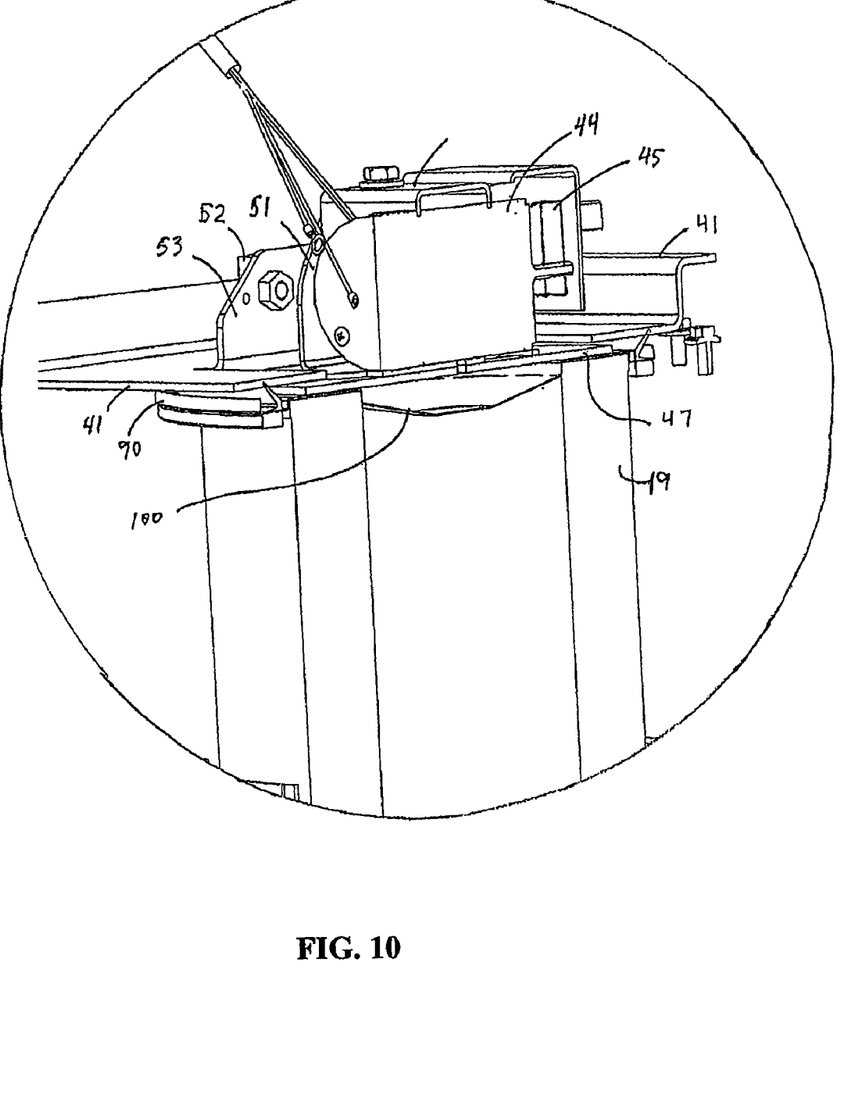
FIG. 10 is a cross sectional view of portions of FIG. 9.

FIG. 10 illustrates a cross sectional view of the shaker mechanism 40 and filter 19 of FIG. 9 in an operational orientation. Top cover 100 is held between a top surface of filter 19 and is in direct contact with shaker plate 47. Upper annular seal 90 is in contact with a lower surface of hinged cover plate 41. Forces generated during rotation of motor 44 and eccentric mass 45 are directly applied to the top of filter 19 and cause filter 19 to shake and dislodge dust and debris on filter 19 surfaces.

Figure 11:
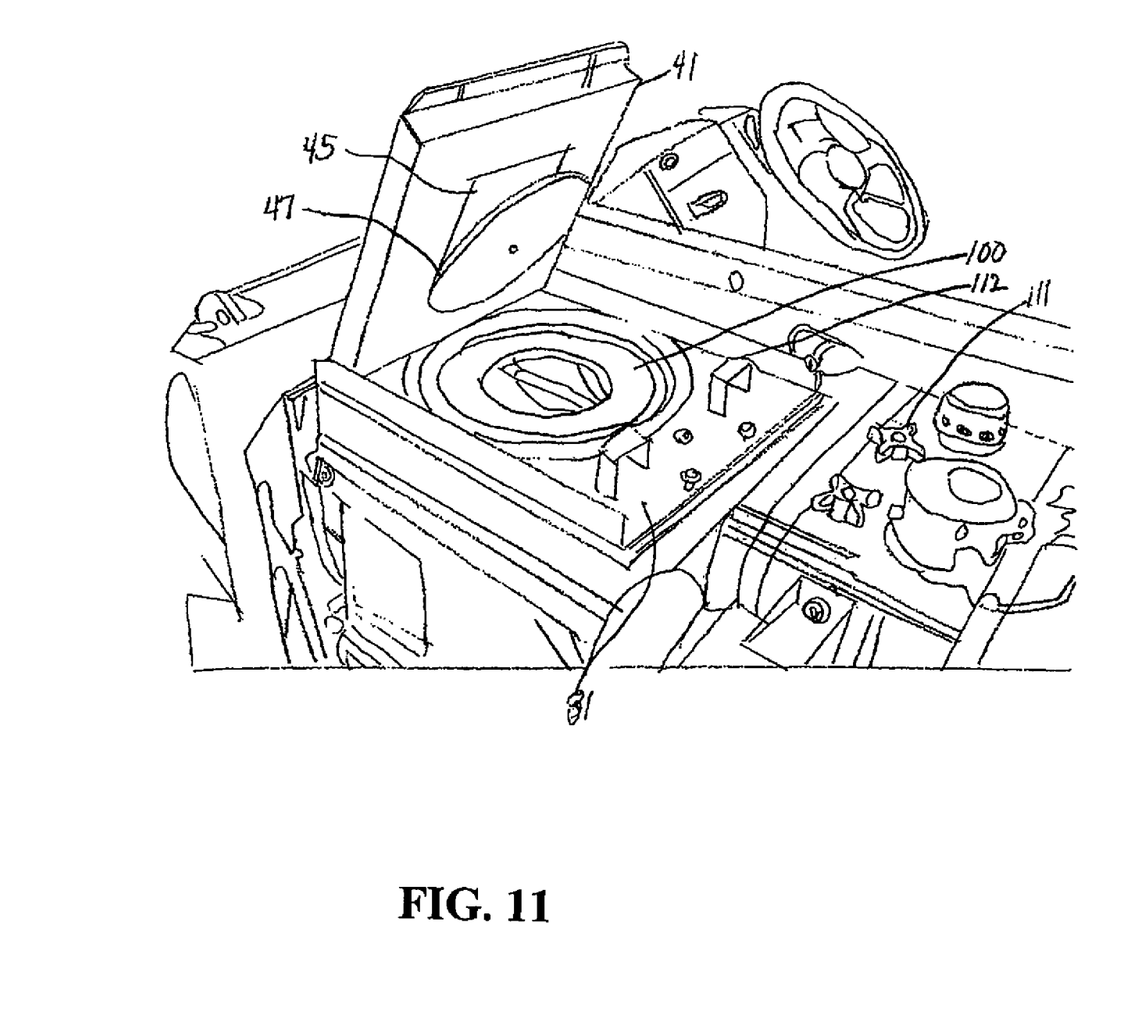
FIG. 11 is a perspective illustration of the machine of FIG. 1.

FIG. 11 illustrates hinged cover plate 41 and connected components in an opened orientation, such as during inspection or replacement of filter 19. Clamp assemblies 43 include knobs 111 which are secured on threaded fasteners 112 held above filter box cover 81. As depicted, removal of knobs 11 from threaded fasteners 112 permits opening of cover plate 41 and access to filter 19.

Figure 12:
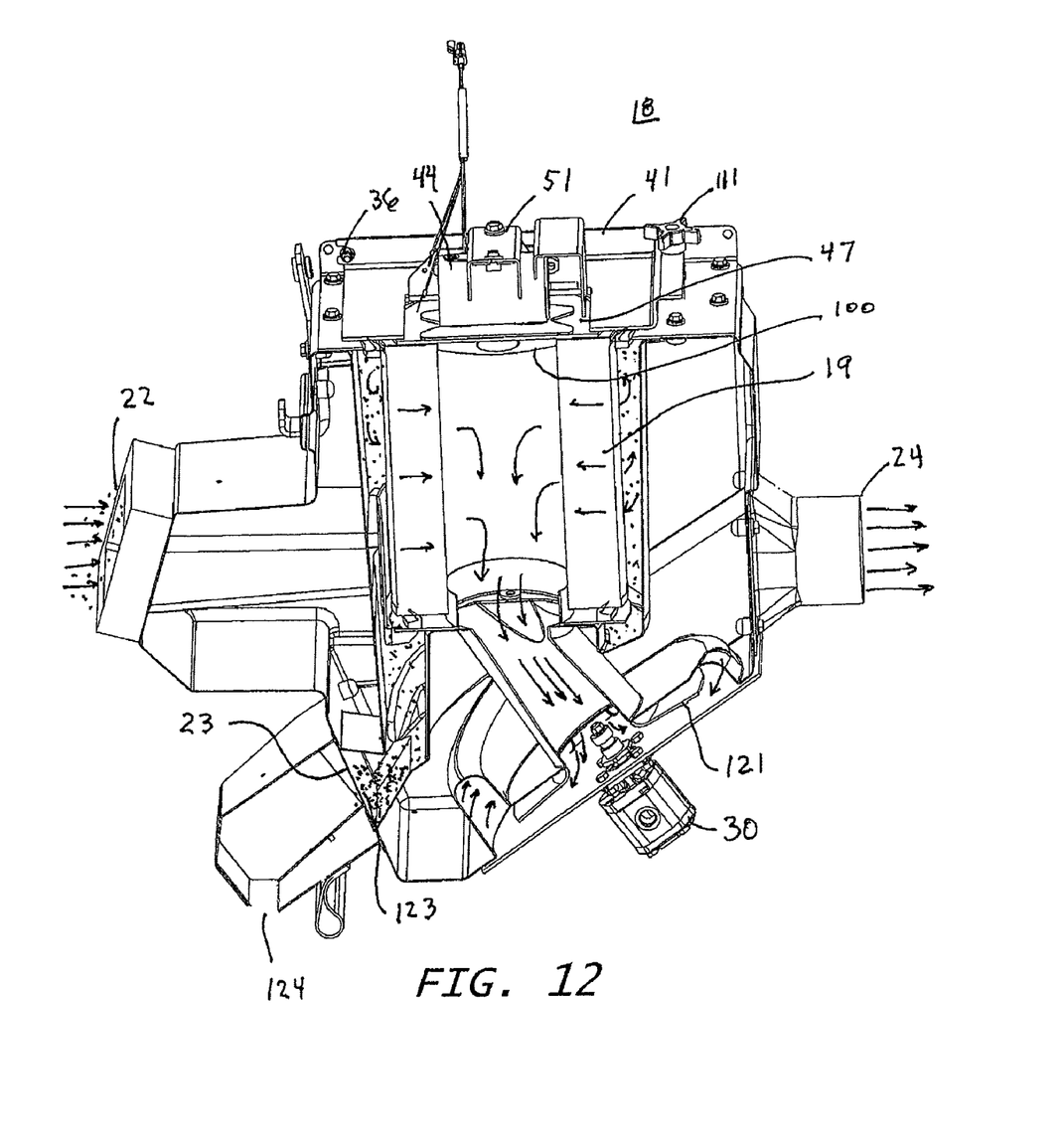
FIG. 12 is a depiction of components of FIG. 1 during operation.

FIG. 12 is a cross-sectional operational depiction of filter box 18 with airflows generally indicated by arrows. In operation, dusty airflow passes first through prefilter 17 and enters filter box 19 at intake opening 22. Air is drawn through filter box 18 upon activation of impeller 121 which is driven by vacuum fan motor 30 and exhausted toward the rear of the machine at air outlet 24. This is a preferred arrangement because the air is cleaned before it passes through the vacuum impeller, which reduces abrasive wear on the impeller. However, some sweepers pass the air first through the blower and then through the filters. This arrangement can also be accommodated by the invention.

During machine 10 operation, dust and debris accumulates near debris outlet 23. Seal 123 is held closed by vacuum action during machine 10 use. In the absence of impeller 121 rotation, debris forces open seal 123 and falls out of hopper box 18 through opening 124. In one example, opening 124 is located within a front hopper of machine 10 and debris falling out of filter box 18 is captured within the front hopper.

During a filter shaking procedure, the motor driven eccentric mass 45 imparts a vibratory motion to filter 19 to dislodge an accumulation of dust and debris. Various means for initiating a cleaning cycle can be envisioned. In one preferred embodiment, shaker motor 44 is activated after each time the vacuum system is turned off. In another embodiment, shaker motor 44 is controlled via a machine controller in response to differential pressure changes across filter 19. A pressure switch for sub-atmospheric pressure may also be installed at filter box 18, with one of its pressure ports connected to the duct leading to the exhaust fan and its other pressure port open to atmosphere. In normal service, as dust gradually accumulates on the filters, the differential pressure will rise. When it reaches a predetermined value the pressure switch will signal a controller to initiate an automatic filter cleaning cycle.

As a cost reduction a pressure switch and control system might be eliminated, leaving only a manual pushbutton to activate shaker motor 44. In this configuration the operator would still have to watch for signs of dirty filters, such as dust starting to come out from under the brush skirts. At that point he or she could push the pushbutton and the cleaning cycle would proceed to its completion. This would retain the advantage of cleaning the filters without interrupting the sweeping operation and without shutting off the dust control air flow, and it would simplify the operator's job. It would also be possible to replace the pressure switch with a timer, while retaining all other features of the system as described. The cleaning cycle could be activated by the timer at predetermined time intervals. This would provide filter cleaning with no attention from the operator and without interrupting sweeping or dust control.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A filter box for a surface maintenance machine comprising:
 a cylindrical air filter positioned within said filter box located remote from a debris hopper of said surface maintenance machine, with said debris hopper being lifted away from a ground surface during a hopper dumping procedure and with said filter box not being lifted during said hopper dumping procedure;
 an electric motor connected to a shaker plate, with said shaker plate engaging the cylindrical air filter;
 an eccentric mass connected to the electric motor and rotating in response to rotation of the electric motor during a filter cleaning procedure, wherein the shaker plate imparts a shaking motion thereto in order to dislodge an accumulation of dust from outer surfaces of said air filter;

a vacuum fan motor attached to said filter box;

a vacuum impeller contained within said filter box and rotated via said vacuum fan motor to draw air through said filter box;

a debris outlet allowing said accumulation of dust from the air filter to pass into said hopper; and a seal across said debris outlet selectively preventing said accumulation of dust from exiting the filter box.

2. The filter box of claim 1 wherein the shaker plate engages a top flat surface of the air filter.

3. The filter box of claim 1 wherein the electric motor is movably coupled to the filter box via a vibration isolating motor mount.

4. The filter box of claim 3 wherein the motor mount limits movement of the air filter to a generally vertical motion during machine operation.

5. A filter box for a surface maintenance machine comprising:

a cylindrical air filter remote from a debris hopper, said debris hopper receiving dust and debris from a sweeping brush;

plate means for restricting airflow through one or more open ends of the air filter;

an electric motor and eccentric mass coupled to said plate means, wherein rotation of the electric motor and eccentric mass imparts a vibrational force to the air filter causing an accumulation of dust to be dislodged;

a vacuum fan impeller contained within said filter box, said fan impeller for drawing air through said filter box; and a sealed debris outlet for selectively passing debris dislodged from said cylindrical air filter into said debris hopper.

6. The filter box of claim 5 wherein the electric motor and eccentric mass are supported on the hopper by a motor mount assembly including a saddle fixture, a clamp, and a pair of connectors sliding within a pair of slots, with said pair of slots being aligned with a center axis of said cylindrical air filter.

7. The filter box of claim 6 wherein the motor mount assembly includes a pair of slide plates which slidably engage portions of said pair of connectors during a filter shaking procedure.

8. The filter box of claim 6 wherein the saddle fixture is secured to said plate means.

9. The filter box of claim 5 wherein said plate means is a generally circular shaker plate extending across a top surface of the cylindrical air filter.

10. The filter box of claim 9 wherein the shaker plate is coupled to a cover plate with at least one vibration isolation mount.

11. The filter box of claim 10 wherein said at least one vibration isolating mount includes a pair of sliding connectors allowing the motor to move in a generally vertical direction relative to ground.

12. A filter box for a surface maintenance machine comprising:

a cylindrical filter contained within said filter box and located remote from a movable debris hopper;

a hinged cover plate;

a shaker plate coupled to one end of the filter, said shaker plate supporting an electric motor and eccentric mass, with said motor being movably coupled to the cover plate via a sliding connection; and a sealed debris outlet for selectively passing an accumulation of debris dislodged from said cylindrical filter into said movable debris hopper.

13. The filter box of claim 12 wherein the shaker plate is coupled to the cover plate via a pair of sliding connections including a pair of slots.

14. The filter box of claim 13 wherein the pair of slots are defined in flanges on the cover plate, and with said pair of slots being aligned generally parallel to a center axis of said cylindrical filter.

15. The filter box of claim 12 wherein the shaker plate is directly connected to a motor frame.

16. The filter box of claim 12 wherein the cover plate is secured to a housing of the filter box via a pair of hinges.

17. The filter box of claim 16 wherein the cover plate is secured to the housing via a pair of clamps.

18. The filter box of claim 16 wherein the cover plate is withdrawn from coupling with the cylindrical filter as said cover plate is opened about said pair of hinges.

19. The filter box of claim 16 wherein the electric motor and shaker plate pivot into contact with a top cover supported by a flat end of the cylindrical filter.

20. The filter box of claim 19 wherein the shaker plate is round in shape and covers substantially all of the flat end of the cylindrical filter.

* * * * *